United States Patent [19]

Fournier et al.

[11] 4,106,184

[45] Aug. 15, 1978

[54] METHOD FOR MAKING FUSED SOLID ELECTROLYTE CAPACITOR ASSEMBLAGES AND A FUSED CAPACITOR MADE THEREBY

[75] Inventors: Lawrence E. Fournier, Penacook, N.H.; Theodore M. Jasiewicz, Westborough, Mass.; William M. Milton, Dover, N.H.

[73] Assignee: Sprague Electric Company, North Adams, Mass.

[21] Appl. No.: 797,204

[22] Filed: May 16, 1977

[51] Int. Cl.² .......................................... B01J 17/00
[52] U.S. Cl. ...................................... 29/570; 29/623; 361/433
[58] Field of Search ................................. 29/570, 623

[56] References Cited

U.S. PATENT DOCUMENTS

| | | | |
|---|---|---|---|
| 2,911,504 | 11/1959 | Cohn | 337/296 |
| 3,076,253 | 2/1963 | Cornelison | 29/583 |
| 3,236,976 | 2/1966 | Rayno | 29/623 |
| 3,783,506 | 1/1974 | Rehfeld | 29/623 |

Primary Examiner—W. Tupman
Attorney, Agent, or Firm—Connolly and Hutz

[57] ABSTRACT

A plurality of regularly spaced solid electrolyte capacitor bodies are held by their anode leads. A group of cathode lead wires are held at the same spacing and an exothermically alloyable fuse strand is laid at right angles over the held cathode leads and attached thereto. The fuse strand is cut in the spaces between adjacent lead wires and the held lead wires are registered with the held capacitor bodies. An insulative layer is provided between each body and an adjacent lead wire. The free ends of the cut fuse segments are connected to the counterelectrodes of the adjacent capacitor bodies and the bodies with attached fuse segments are encapsulated as by molding.

16 Claims, 12 Drawing Figures

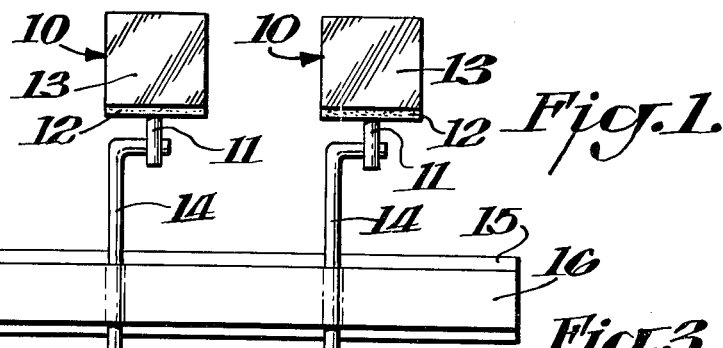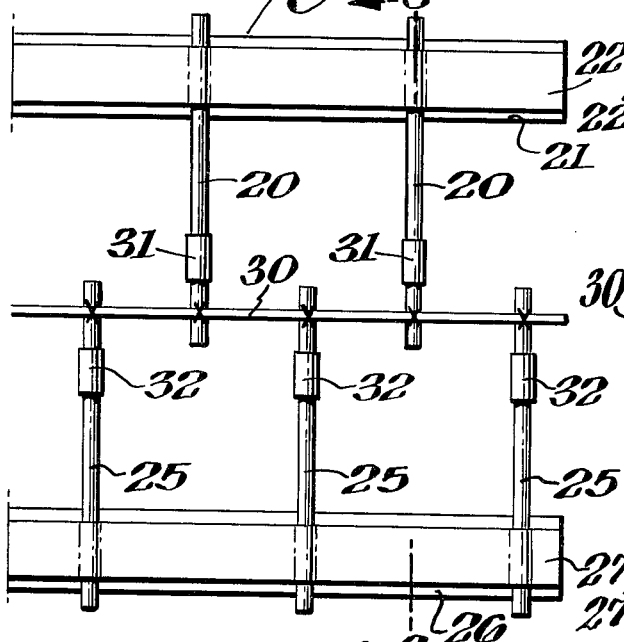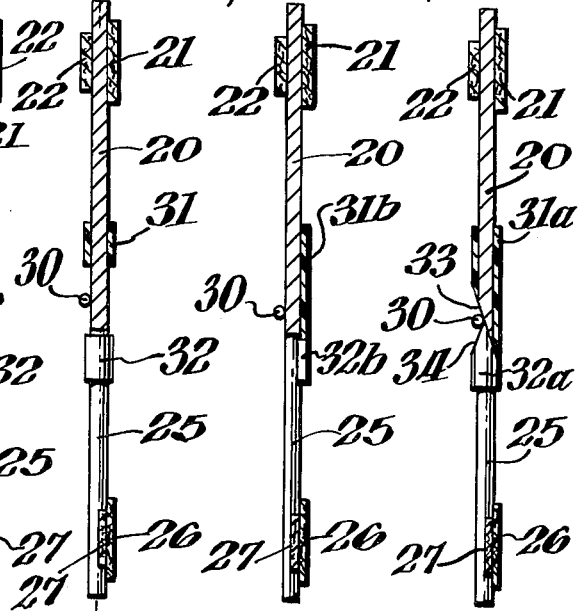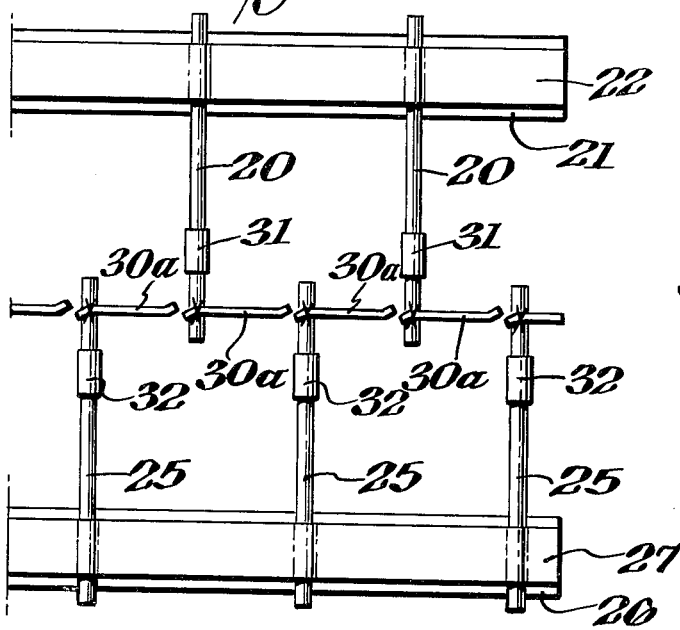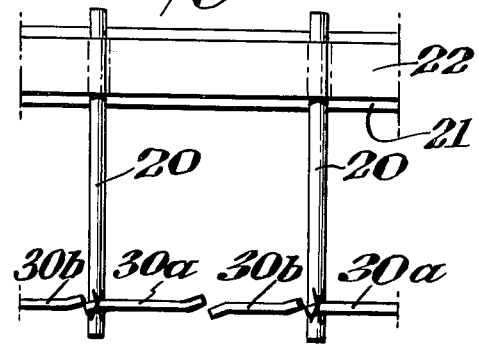

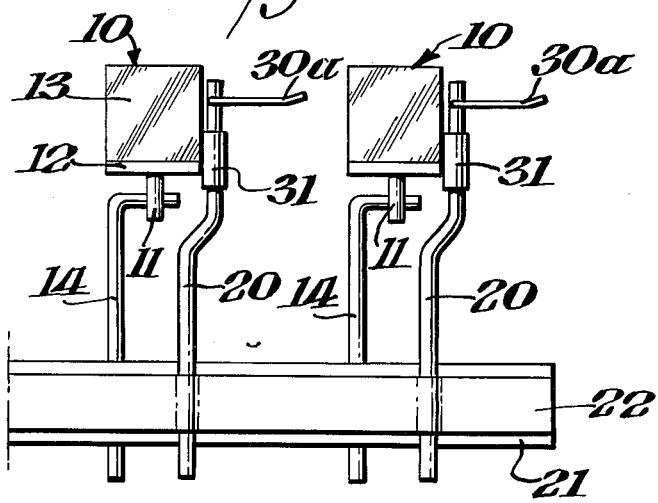
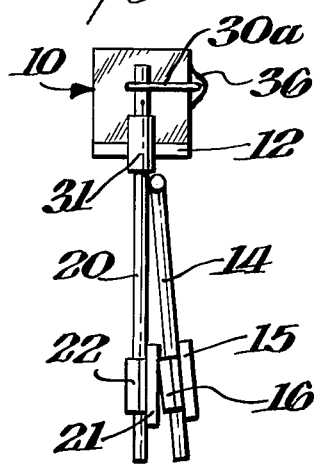
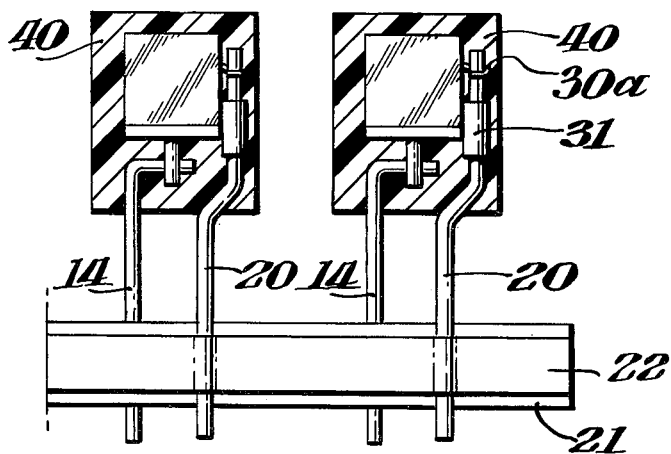
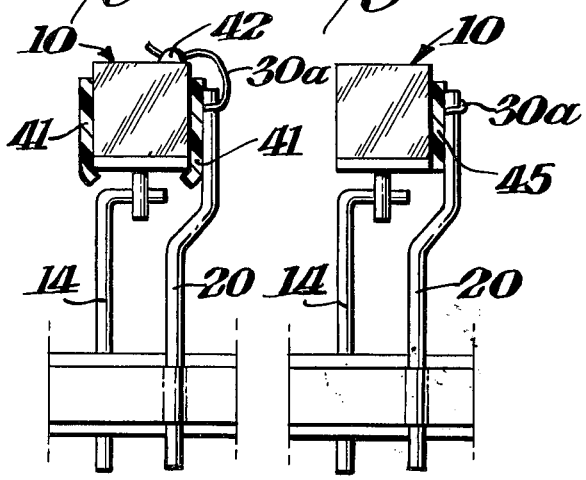

METHOD FOR MAKING FUSED SOLID ELECTROLYTE CAPACITOR ASSEMBLAGES AND A FUSED CAPACITOR MADE THEREBY

BACKGROUND OF THE INVENTION

This invention relates to a method for making fused solid electrolyte capacitor assemblages and packages, and more particularly to such packages employing an exothermically alloyable fuse.

Such a fused solid electrolyte capacitor package is described in the U.S. Pat. application Ser. No. 797,206 to George A. Shirn and John P. Maher filed concurrently herewith. A solid electrolytic capacitor is provided with an exothermically alloyable fuse to disconnect a faulty capacitor from circuit voltage within an electronic system and to prevent damage to the system from overheating of the faulty capacitor. The exothermically alloyable fuse typically consists of a fine aluminum wire or strip having clad thereover a layer of palladium. When the temperature of any portion of the Al-Pd fuse reaches about 650° C; exothermic alloying commences and progresses away from the point of kindling, advantageously effecting the near total obliteration of the fuse.

Any process by which such a fuse may be successfully assembled within the package must be avoid inadvertent kindling of the fuse, especially when making the electrical joints thereto, and must avoid breakage of the usually fine delicate fuse wire. Also when expensive precious metals are employed in the fuse, an important consideration is the avoidance of fuse wire scrap or waste.

It is therefore an object of the present invention to provide a disciplined, automatable method for manufacturing fused solid electrolyte capacitor assemblages employing fine exothermically alloyable fuses.

SUMMARY OF THE INVENTION

A method for making fused solid electrolyte capacitor assemblages comprises holding a plurality of regularly spaced solid electrolyte capacitor bodies by their anode leads, holding one group of mutually parallel cathode lead wires by one end portion thereof with the same regular spacing as that of the capacitor bodies, placing a continuous bi-metallic exothermically alloyable fuse strand over the other end portions of the cathode lead wires, forming a joint at each intersection of the fuse strand and each lead wire, cutting the fuse strand in each space between the adjacent of the joints, and registering the held group of cathode lead wires with the held plurality of capacitor bodies so that the aforesaid other end portion of each lead wire lies adjacent to one of the bodies. A layer of insulation provides a spacer and electrical insulation between each body and the adjacent lead wire. The free end of the cut fuse segment extending from each lead wire is then connected to the cathode counterelectrode of the adjacent capacitor body. Subsequently each body may be encapsulated along with the adjacent fuse segment and with the other end portion of the adjacent lead wire to form a plurality of mechanically sound fused capacitor packages each having an anode and a cathode lead extending from the encapsulating resin.

Since in the above described method the cut fuse segments are about as long as the spacing between the spaced bodies, and since this length is generally longer than needed or wanted to serve as the package fuse, the method is preferably modified by employing another group of regularly spaced and held lead wires, the spacing also being the same as that of the held bodies. Additional steps comprise positioning the two groups of held lead wires so that the other end portions thereof are interdigitated. The strand of fuse wire is then positioned over all the lead wires making intersecting contact with all the interdigitated lead wires in the other end portions thereof. A joint is made at each intersection. The cutting step now consists in cutting the fuse strand in the spaces between all adjacent joints. Fuse segments extending from each lead wire are consequently no longer than half the regular spacing between capacitor bodies and thus both groups of lead wires with equally extending fuse segments may be employed in the further steps of assembly.

The aforesaid provision of an insulating layer between each body and the adjacent lead wire may be accomplished by a variety of means. The preferred means comprises heating the group of held lead wires and momentarily immersing the other end portions thereof into a fluidized bed of uncured (or partially cured) epoxy powder prior to the registration step. A small patch of the resulting cured insulative coating is then removed from each wire to provide a bare wire portion at which a joint to the fuse wire may be made. Another means includes applying an insulative coating to the body also prior to the registration step.

The method of this invention is characterized by the holding of the parts to be assembled at each process step in groups at regular intervals making possible the execution of each operation either simultaneously or sequentially on a ganged basis. This highly disciplined manufacturing method is particularly well suited for the accurate and gentle assembly of short hair-fine segments of exothermically alloyable fuse wire without waste, and all steps of the method are readily automatable.

BRIEF DESCRIPTION OF THE DRAWING

FIG. 1 shows in front view two of a plurality of solid electrolyte capacitor bodies being held by their anode leads in a standard carded wire assembly.

FIG. 2 shows in front view two groups of carded cathode lead wires in interdigitated arrangement with a fuse wire placed over and intersecting each of the lead wires.

FIG. 3 shows in side sectional view the assembly of FIG. 2.

FIG. 4 shows in side sectional view an alternative assembly to that of FIG. 2.

FIG. 5 shows in side sectional view another alternative assembly to that of FIG. 2.

FIG. 6 shows the assembly of FIG. 2 after the fuse wire has been cut.

FIG. 7 shows in front view a similar assembly to that of FIG. 6 except only one carded group of cathode lead wires is employed.

FIG. 8 shows in front view a portion of the assembly of FIG. 6 registered with the assembly of FIG. 1.

FIG. 9 shows in side view the assembly of FIG. 8 after the free ends of the fuse wire have been connected to the counterelectrode of the adjacent capacitor bodies, respectively.

FIG. 10 shows in front view the capacitor packages of FIGS. 8 and 9 with the encapsulation cut away to reveal the internal structure.

FIG. 11 shows in front view an assembly similar to that of FIG. 8 except having a plastic jacket about the body instead of the insulative coating about the cathode wire lead.

FIG. 12 shows in front view an assembly similar to that of FIG. 8 except having an insulative layer between the body on the right side and the uninsulated cathode wire lead, and except that the fuse is connected to the top of the body.

The Figures are not to scale, the lateral dimensions being magnified as needed to clearly show all of the structural elements of the assemblies.

DESCRIPTION OF THE PREFERRED EMBODIMENTS

With reference to FIG. 1, conventional solid electrolyte capacitor bodies 10, consist of a porous valve-metal anode having a valve-metal anode riser 11 extending from one face thereof and a thin valve-metal oxide film (not shown) grown over all surfaces of the porous anode. The valve-metal is usually tantalum. A layer of a solid electrolyte (not shown), preferably manganese dioxide, overlies the oxide film and a cathode counterelectrode typically consists of a first layer of graphite 12, and a subsequent metal layer 13. The outer metal counterelectrode layer 13 is preferably a solderable metal such as copper, tin, or a solder alloy. A detailed account of a process by which such capacitor bodies are constructed is given in U.S. Pat. No. 3,950,842 issued Apr. 20, 1976 which is incorporated herein by reference. During the process for making such capacitor bodies the ends of the anode risers of a plurality of anodes are spot welded to and held by a metal bar at regular intervals. In this embodiment each interval is about 0.5 inch (1.3 cm.), which generally corresponds to the spacing usually chosen for convenience and economy in prior art practice.

Referring again to FIG. 1 the anode risers 11 have been cut short and separated from the metal holding bar (not shown) after each riser has been welded to a regularly spaced lead wire 14. This is most conveniently accomplished by keeping the spacing of the anode wires the same as that of the bodies that were attached to the bar. However, the uncut riser wire and holding bar may be substituted during some or even all of the method steps in the method of this invention in place of the herein depicted anode leads and an anode leads holding means to be described, respectively.

The anode lead wires 14 are captured and held in a standard holder consisting of a cardboard strip 15 and an adhesive tape 16. Referring to FIG. 2, a group of cathode lead wires 20 are partially shown captured and held by cardboard strip 21 and adhesive tape 22. Another group of cathode lead wires 25 are held in a similar assembly by cardboard strip 26 and adhesive tape 27.

These two groups of cathode lead wires are positioned in interdigitated fashion in a common plane 28 as illustrated in side view of this assembly in FIG. 3. The fuse wire 30 is then placed over the interdigitated lead wires at right angles thereto forming an intersection with each of the leads 20 and 25. The fuse wire 30 is an exothermically alloyable bi-metallic strand and more particularly in this embodiment is a wire having an aluminum core and an outer jacket of palladium with an outside diameter of 0.002 inch (0.005 cm.). This fuse wire and other exothermically alloyable fuse strands are described in more detail in the above noted patent application of Shirn et al, which is incorporated herein by reference. The leads 14, 20 and 25 are preferably tinned copper and have a diameter of approximately 0.02 inch (0.05 cm.).

An important feature of the assembly shown in FIGS. 2 and 3 are the bands 31 and 32 of insulative material that encircle a portion of each cathode lead wire. A preferred method by which these insulative bands are applied consists in heating a group of lead wires, e.g. 20, to a temperature of approximately 150° C and momentarily submersing the lead wire end portions that are opposite the lead wire ends being held by strip 21 and strip 22, into a fluidized bed of uncured epoxy powder. Subsequently a patch of the insulative band at said opposite lead end may be removed to provide a bare lead area to which the connection of the fuse strand may be made. This partial removal of insulative layer 31 may be accomplished by any of various well known abrasive means. Alternatively, this may be accomplished by cutting the above noted lead tips at a slant to provide broad lead areas 33 and 34 that are bare of the insulative coatings 31a and 32a, respectively, and further to form in the assembly a stable notch-like position in which the fuse wire may be placed as illustrated in FIG. 4.

Thereafter, a joint is formed at each intersection between the fuse wire 30 and each lead wire 20 and 25, each joint being illustrated in FIG. 2 by an "x". The joint is preferably made by soldering, employing a solder having a melting point lower than the kindling temperature of the exothermically alloyable fuse wire. The aluminum-palladium wire kindles at about 650° C and most solders are therefore suitable for forming this joint. The lead wire 20 may consist of copper having an outer coating of solder so that the joint may be simply made by the local application of heat to reflow the solder. A conventional soldering iron may be used to form the joints sequentially or a multiple arrangement of hot bars may be used to form the joints simultandously. Alternatively a welder may be used to form the joint by resistance soldering, but fusion welding of a fine strand of exothermically alloyable wire would tend to kindle the fuse and is considered impractical unless the end of the fuse wire to be welded is stripped of the outer metal (e.g. the palladium of the Al-Pd fuse wire). Ultrasonic welding may also be used. Also the joint may be made by applying a metal loaded liquid resin and curing the resin.

The next step consists in either simultaneously or sequentially cutting the fuse wire in each space between the adjacent of the joints so that the fuse wire segment 30a extends from each of the lead wires as illustrated in FIG. 6.

An alternative method for connecting a fuse wire strand to a group of lead wires 20 is illustrated in FIG. 7. In this case, only one group of carded lead wires is employed rather than the two groups 20 and 25 as illustrated in FIG. 2. Although slightly simpler, the steps illustrated in FIG. 7 generally result in the loss of some of the precious fuse wire to the disciplined process of this invention since the length of the fuse segment 30a is determined by the length of the fuse desired in the final assembly. The preferred fuse segment length is about 5 millimeters for optimum ease in handling and economy of fuse wire usage, whereas the spacing between capacitor bodies is typically about 10 millimeters. In practice the spacing between lead wires 20 is substantially greater than the desired length of fuse segment 30a, and therefore segment 30b cannot be employed and is scrapped in the method of this invention.

After the fuse wires have been cut, one carded group of cathode lead wires 20 is registered with the carded capacitor bodies so that an insulated portion of each cathode lead wire is positioned adjacent to a side of one of the capacitor bodies as illustrated in FIGS. 8 and 9. The spacing between the carded bodies is purposefully made equal to the spacing between the cathode lead wires to make this registration step possible. The fuse segment 30a is connected to the backside of the counterelectrode 13 by solder joint 36. The alternative joint means by which the fuse segment is connected to the cathode lead wires noted above are also applicable to the joint between the fuse segment and the counterelectrode.

The assembly of FIGS. 8 and 9, comprising a plurality of fused solid electrolyte assemblages, is now registered in a multiple cavity mold and an encapsulating resin 40 is applied about each assemblage including a body 10, fuse segment 30a and ends of lead wires 14 and 20 by a standard transfer molding process, as is illustrated in FIG. 10.

The insulative layers 31b and 32b may be provided by an alternative method to those noted above, namely by selectively applying an insulative coating only part way around or simply to one side of the lead wires 20 and 25, respectively, as illustrated in FIG. 5. This method avoids the necessity for removing a portion of the insulative layer to provide a bare lead portion to which the fuse wire may be joined. However, the assembly of lead wires so insulated cannot be made to a side of the body as illustrated in FIG. 8 without the risk of shorting, but rather the cathode leads must be shifted leftward from their position as shown in that figure so as to be adjacent to the front face of the capacitor body for proper insulation therefrom.

The insulation between the cathode lead and the body may also be provided by the two alternative means illustrated in FIGS. 11 and 12. In FIG. 11 the cathode leads are not insulated but rather the body has a plastic sleeve 41 thereover preferably formed by threading a loose fitting heat shrinkable plastic tube thereover and subsequently heating to shrink the sleeve 41 conformally about the body. In FIG. 11 the free end of the fuse wire 30a is connected by a solder joint 42 to the top surface of the body.

In FIG. 12 a layer of insulation 45 is provided only in the region of the body to which the cathode lead is adjacent. This may be accomplished by the selective application as by brushing of a liquid insulative coating that is subsequently cured, or alternatively by applying a patch of adhesive tape to the body.

What is claimed is:

1. A method for making fused solid electrolyte capacitor assemblages comprising holding at regular intervals a plurality of solid electrolyte capacitor bodies by their anode leads; holding at said regular intervals one group of mutually parallel cathode lead wires, each lead wire being held at one end portion thereof; placing a continuous bi-metallic exothermically alloyable fuse strand over the other end portions of said lead wires so as to intersect each of said lead wires; forming a joint at each of said intersections; cutting said fuse strand in each space between the adjacent of said joints so that a segment of said fuse strand extends from each of said lead wires, respectively; registering said held group of cathode lead wires with said held plurality of capacitor bodies so that said other end portion of each lead wire lies adjacent to one of said bodies; providing an insulative layer between each of said bodies and said adjacent lead wire; and connecting the free end of each of said fuse segments to the cathode counterelectrode of the adjacent of said bodies, respectively.

2. The method of claim 1 additionally comprising encapsulating in an organic resin the portion of each of said assemblages that includes one of said bodies, said connected fuse segment and said other end portion of said adjacent lead wire to form a plurality of mechanically sound fused capacitor packages each having an anode and cathode lead extending from said encapsulating resin.

3. The method of claim 1 wherein said insulative layer is provided by applying a liquid organic resin coating to said other end lead portions and curing said resin.

4. The method of claim 1 wherein said insulative layer is provided by heating said held lead wires and momentarily immersing said other ends into a fluidized bed of uncured epoxy powder to provide a cured epoxy coating over said other ends.

5. The method of claim 3 additionally comprising removing a small patch of said insulative layer from each of said lead wires and wherein said placing includes locating each of said intersections at the site of removal of one of said patches.

6. The method of claim 3 additionally comprising cutting on a slant the tips of said other end lead portions to provide a bare lead area free from said insulative layer at which area said forming of said joints is subsequently accomplished.

7. The method of claim 1 additionally comprising holding at said regular intervals another group of mutually parallel cathode lead wires, each lead wire of said another group being held at one end portion thereof; positioning said one and another held groups of lead wires so that the other end portions thereof are interdigitated, said placing being accomplished so that said fuse strand also intersects said lead wires of said another group; forming a joint at each of said strand intersections with said another group wires; and cutting said fuse strand in each whole length between the adjacent intersections of said strand with said lead wires of said one and of said another group.

8. The method of claim 7 wherein said insulative layer is additionally provided by applying a liquid organic resin coating to said other end lead portions of said another group and curing said resin.

9. The method of claim 8 additionally comprising removing a small patch of said insulative layer from each of said lead wires of said another group and wherein said placing includes locating each of said intersections at the site of removal of one of said patches.

10. The method of claim 8 additionally comprising cutting on a slant the tips of said other end lead portions of said another group to provide a broad bare lead area at which area said forming of said joints is subsequently accomplished.

11. The method of claim 1 wherein said insulative layer is provided by fitting a heat shrinkable plastic sleeve over said bodies and applying heat to provide a conformal insulative layer about the periphery of said bodies.

12. The method of claim 11 wherein said connecting of said free end of said fuse segment is accomplished at the face of each said body that is opposite to the face from which said anode lead extends.

13. The method of claim 1 wherein said insulative layer is provided by selectively applying said layer to one side of each of said bodies.

14. The method of claim 1 wherein said providing of said layer is accomplished by pressing to said body a piece of insulative adhesive tape.

15. The method of claim 1 wherein said fuse strand is a wire consisting of an aluminum core and a layer of palladium clad thereover.

16. The method of claim 15 wherein the diameter of said fuse wire is about 0.002 inch.

* * * * *